US012571361B2

(12) United States Patent
Doshi et al.

(10) Patent No.: US 12,571,361 B2
(45) Date of Patent: Mar. 10, 2026

(54) THERMAL MANAGEMENT FOR RAMJET-RDRE CONFIGURATION OF RBCC

(71) Applicant: VENUS AEROSPACE CORP, Houston, TX (US)

(72) Inventors: Vishal Doshi, Houston, TX (US); Wade Allen McElroy, Houston, TX (US); Aaron Ezekiel Smith, Houston, TX (US); Ali Moradi, Houston, TX (US); William Thomas Ross, League City, TX (US); Jacob T. Needels, Houston, TX (US)

(73) Assignee: VENUS AEROSPACE CORP, Houston, TX (US)

( * ) Notice: Subject to any disclaimer, the term of this patent is extended or adjusted under 35 U.S.C. 154(b) by 0 days.

(21) Appl. No.: 18/966,919

(22) Filed: Dec. 3, 2024

(65) Prior Publication Data

US 2025/0270970 A1 Aug. 28, 2025

Related U.S. Application Data

(62) Division of application No. 18/584,758, filed on Feb. 22, 2024, now abandoned.

(51) Int. Cl.
| | |
|---|---|
| *F02K 9/78* | (2006.01) |
| *F01P 1/06* | (2006.01) |
| *F02K 7/14* | (2006.01) |
| *F02C 5/10* | (2006.01) |
| *F02K 7/18* | (2006.01) |
| *F23R 7/00* | (2006.01) |

(52) U.S. Cl.
CPC .................. *F02K 9/78* (2013.01); *F01P 1/06* (2013.01); *F02K 7/14* (2013.01); *F02C 5/10* (2013.01); *F02K 7/18* (2013.01); *F23R 7/00* (2013.01)

(58) Field of Classification Search
CPC ...... F02K 9/78; F02K 7/14; F02K 7/18; F01P 1/06
See application file for complete search history.

(56) References Cited

U.S. PATENT DOCUMENTS

| | | | | |
|---|---|---|---|---|
| 2,547,936 | A * | 4/1951 | Grow | F02K 9/80 60/264 |
| 3,210,934 | A * | 10/1965 | Smale | F02K 1/825 60/264 |
| 3,218,974 | A * | 11/1965 | Samms | F02K 7/18 60/225 |
| 5,307,624 | A * | 5/1994 | Even-Nur | F02K 3/075 60/226.3 |
| 7,762,077 | B2 * | 7/2010 | Pederson | F02K 7/14 60/768 |
| 2018/0231256 | A1 * | 8/2018 | Pal | F02C 5/02 |

(Continued)

OTHER PUBLICATIONS

De Laval nozzle [Wikipedia webpage https://en.wikipedia.org/wiki/De_Laval_nozzle accessed on May 24, 2024] (Year: 2024).*

*Primary Examiner* — Lorne E Meade

(74) *Attorney, Agent, or Firm* — HAYES SOLOWAY P.C.

(57) ABSTRACT

Disclosed is an aircraft having a rocket-based combined cycle (RBCC) propulsion system including a rotating detonation rocket engine (RDRE) and an airbreathing jet engine. The RDRE is located within a throat area of the jet engine and is configured to be cooled by air bypassed from upstream of the jet engine.

13 Claims, 7 Drawing Sheets

(56)                    References Cited

U.S. PATENT DOCUMENTS

2020/0386189 A1 *  12/2020  Powell ...................... F02K 3/11
2023/0323809 A1 *  10/2023  Cross ......................... F02C 7/18
                                                  60/768

* cited by examiner

THERMAL MANAGEMENT FOR RAMJET-RDRE CONFIGURATION OF RBCC

CROSS REFERENCE TO RELATED APPLICATION

This application is a divisional of U.S. patent application Ser. No. 18/584,758, filed Feb. 22, 2024, entitled "Thermal Management for Ramjet-RDRE Configuration of RBCC", the entire contents of which are incorporated herein by reference.

TECHNICAL FIELD

The present disclosure relates to aircraft and aircraft engines, and more particularly to aircraft having rocket-based combined cycle (RBCC) propulsion systems comprising a rotating detonation rocket engine (RDRE) and an airbreathing jet engine such as a ramjet (RJ) combustor engine. However, the disclosure is not limited to RBCC propulsion systems comprising RDRE and RJ combustion engine but advantageously may be employed with other types of airbreathing jet engines, including turbojet engines, scramjet engines, and pulsejet engines.

BACKGROUND AND SUMMARY

This section provides background information related to the present disclosure which is not necessarily prior art. This section provides a general summary of the disclosure and is not a comprehensive disclosure of its full scope or all its features.

RDREs are rocket engines using a form of pressure gain combustion based on a detonation wave traveling around an annular channel or annulus. In detonative combustion the flame front travels at supersonic speeds, permitting higher efficiency combustion than deflagrative combustion.

In operation of an RDRE, fuel and oxidizer are injected into the channel, normally through small holes or slits, and detonation is initiated in the fuel/oxidizer mixture by an igniter. After the engine is started, the detonations are self-sustaining to maintain operation of the RDRE. That is, once deflagration ignites the fuel/oxidizer mixture, the energy released sustains the detonations or detonation wavefront in subsequent order. The products of detonation combustion expand out of the channel and are further pushed out of the channel by incoming fuel and oxidizer, resulting in a propelling force capable of driving an aircraft or rocket at supersonic or hypersonic speed.

RDREs have advantages over rocket deflagrative combustion engines in that RDREs typically produce the same thrust while burning about 10-20% less fuel than deflagrative combustion rocket engines. Equipping aircraft with an airbreathing jet engine, such as a ramjet (RJ) combustion engine, and an RDRE rotating detonation rocket engine whereby to form a rocket based combine cycle (RBCC) propulsion system, permits us to produce an aircraft that can take off and land under airbreathing jet engine power but then transition to rocket power once the aircraft reaches altitude. This enables an aircraft to operate in multiple flight regimes (subsonic, supersonic, hypersonic) using only a single propulsion system flow path (i.e. not requiring an airbreathing engine, a separate rocket engine, etc.) RBCC propulsion systems also have an advantage of providing additional performance capabilities, all the while eliminating redundant propulsion components and weight thereof.

In accordance with the present disclosure, we provide aircraft having rocket-based combined cycle (RBCC) propulsion systems comprising a rotating detonation rocket engine (RDRE) downstream of an airbreathing jet engine such as a ramjet (RJ) combustor. Combining an RDRE and an airbreathing jet engine in a single vehicle presents certain technical challenges. For one, when the airbreathing jet engine is operating, the RDRE is bathed in hot jet engine exhaust. This presents a thermal management challenge since the hot jet engine exhaust raises the temperature of the RDRE to above allowable operating temperatures. Also, locating the RDRE downstream of the jet engine, i.e., in the exhaust of the jet engine, affects the performance of the jet engine by modifying the throat area at the jet engine exhaust nozzle.

In order to address the aforesaid thermal management challenges, we cool the RDRE to allowable operating temperatures during jet engine operation by using air bypassed from the jet engine for cooling the RDRE.

In one embodiment, we use bypassed air from the jet engine for film cooling the RDRE.

In another embodiment, we circulate the jet engine fuel through the RDRE casing and/or supports for the RDRE to cool the RDRE.

In accordance with another embodiment of the present disclosure, we control geometry and position of the RDRE in the jet engine exit throat area to maximize jet engine thrust. In one embodiment, we configure the RDRE so that the RDRE is physically movable within the aircraft relative to the jet engine throat area and/or provide a moveable body cap on the RDRE to modify geometry and, therefore, the effective surface area of the RDRE in the jet engine exit throat area.

In one embodiment of the disclosure, in order to provide thermal management of the RDRE when the jet engine is in operation and the RDRE is not (i.e., RDRE cannot utilize regeneration to dissipate heat), air bypassed from upstream of the jet engine combustor is used for film cooling over the exterior surface of the RDRE. In the configuration where the RDRE is attached to a central bluff body in the aircraft, we direct air via a bypass duct to film coat the exterior surface of the RDRE.

In another embodiment, we hold the RDRE in place in the throat area of the jet engine using struts. In this alternative embodiment, bypassed air is captured and passed through hollow support struts for the RDRE, where it is exhausted from the surface of the struts through pores, i.e., similar to turbine film cooling. In yet another embodiment, we cool the air by passing the air through a heat exchanger which is cooled by contact with the jet fuel before the jet fuel is fed to the jet engine.

In yet another embodiment, performance of the jet engine is controlled by modifying the location of the RDRE, e.g., translating the RDRE axially within the throat area of the jet engine.

In yet another embodiment, we provide a body cap in front of the RDRE so that the effective area of the RDRE can be modified. In a further embodiment, the body cap is axially movable relative to the RDRE.

According to one embodiment there is provided an aircraft having a rocket-based combined cycle (RBCC) propulsion system comprising a rotating detonation rocket engine (RDRE) and an airbreathing jet engine, wherein the RDRE is located within a throat area of the jet and is configured to be cooled by air bypassed from upstream of the jet engine.

In one embodiment the bypassed air is directed to film cool an outer surface of the RDRE from an air intake upstream of the jet engine.

In such embodiment, the bypassed air preferably is cooled by passing through a heat exchanger before film cooling the RDRE.

In another embodiment, the bypassed air is cooled by heat exchange with fuel for the jet engine before film cooling the RDRE.

In a further embodiment the bypassed air comprises ram air from the jet engine.

In yet another embodiment the RDRE is fixedly positioned relative to the jet engine throat area.

In an alternative embodiment the RDRE is axially movable within the throat area of the jet engine.

In another embodiment the RDRE is supported in the throat area of the jet engine by studs.

In a further embodiment the RDRE is movably supported to a wall in the throat area of the jet engine.

In another embodiment the RDRE is supported in the throat area of the jet engine by studs which are hollow at least in part. In said embodiment the studs preferably include pores configured for expelling cooling air onto a surface of the RDRE.

In a further embodiment the RDRE includes a cover or shield on its leading end. In said embodiment the cover or shield preferably is axially movable relative to the leading end of the RDRE.

In a further embodiment the RDRE is supported in the throat area of the jet engine by studs which include an injector configured to introduce unburned fuel into the throat area of the jet engine downstream of the RDRE.

In one embodiment the jet engine comprises a ramjet.

In another embodiment the jet engine comprises a scramjet.

In yet another embodiment the jet engine comprises a turbojet.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the instant disclosure will be seen from the following detailed description taken in conjunction with the accompanying drawings. The drawings described herein are for illustrative purposes only of selected embodiments and not all possible implementations and are not intended to limit the scope of the present disclosure.

DETAILED DESCRIPTION

Figure 1:
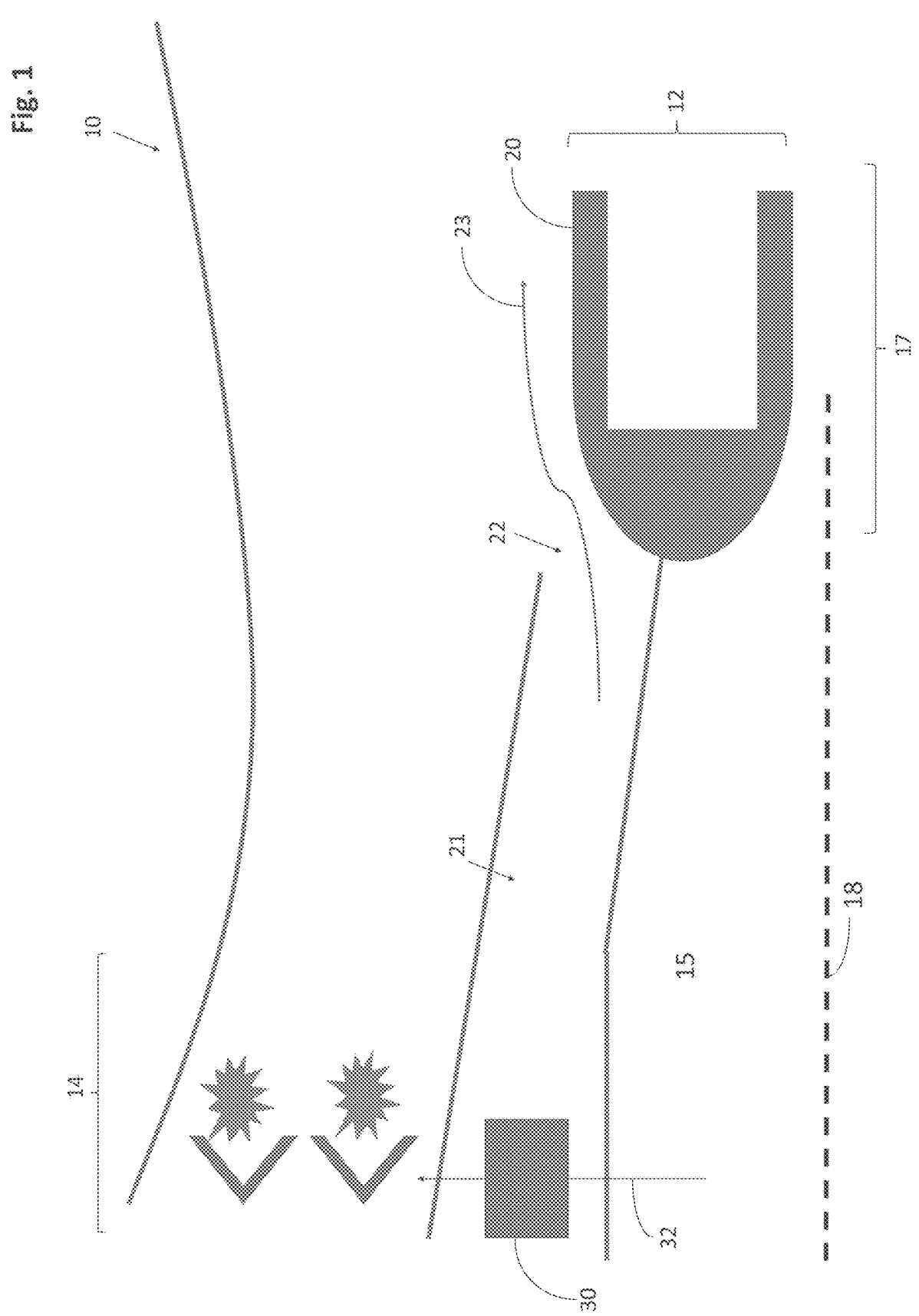
FIG. 1 is a schematic diagram of a rocket-based combined cycle (RBCC) propulsion system incorporating a rotating detonation rocket engine (RDRE) downstream of an air-breathing jet combustor engine in accordance with a first embodiment of the present disclosure (for the purposes of illustration, only half the engine is shown, i.e., along the midline or symmetry line of the RJ combustion engine)

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the following detailed description, the airbreathing combustion jet engine is described as being a ramjet (RJ) engine. However, the jet engine may comprise any type of airbreathing jet engine including by way of example, but not limited to, a turbojet engine, or a scramjet engine.

Referring to FIG. 1, an RBCC propulsion system 10 in accordance with the present disclosure includes a rotating detonation rocket engine (RDRE) 12 and a ramjet (RJ) engine 14. RDRE 12 is fixedly positioned in the exhaust section 17 of the RJ 14, i.e., along the symmetry line 18 of the RJ 14, attached to a central bluff body 15.

An airduct 21 is provided with air intake (not shown) upstream of the RJ combustion chamber and has an air outlet 22 configured to direct a bypass airstream 23 to film cool the outer surface 20 of the RDRE 12, cooling the RDRE 12. In one embodiment, bypass air may be cooled in heat exchanger 30 by heat exchange with the RJ fuel which is passed through the heat exchanger 30 via fuel line 32 before being fed to the combustion section of RJ 14.

Figure 2:
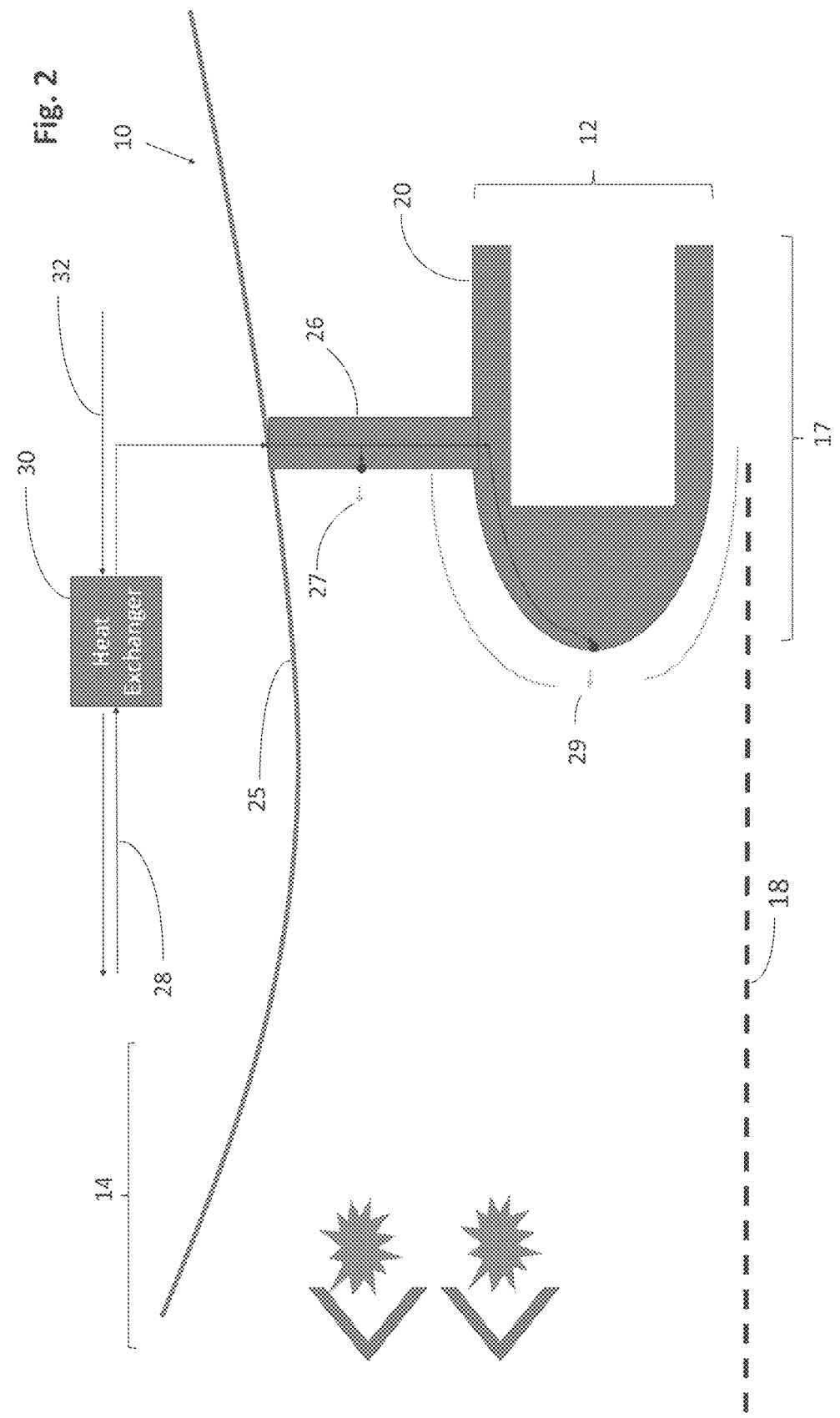
FIG. 2 is a view, similar to FIG. 1, of a second embodiment of a RBCC propulsion system in accordance with the present disclosure.

Referring to FIG. 2, in one embodiment, the RDRE 12 is fixed to the wall 25 of the exhaust section 17 of RJ 14 by a plurality of hollow struts 26. In one embodiment, bypassed air 28 is cooled by passing through a heat exchanger 30 and ducted into hollow struts 26. Struts 26 are hollow and have pores configured to direct an air film 27 over the outer surface of the strut 26, i.e., similar to turbine blade film cooling. Bypass air from the strut is directed into channels in the RDRE 12 and out pores to direct an air film 29 over the RDRE outer surface 20. In one embodiment, bypass air may be cooled in heat exchanger 30 by heat exchange with the RJ fuel which is passed through the heat exchanger 30 via fuel line 32 before being fed to the combustion section of RJ 14.

Figure 3:
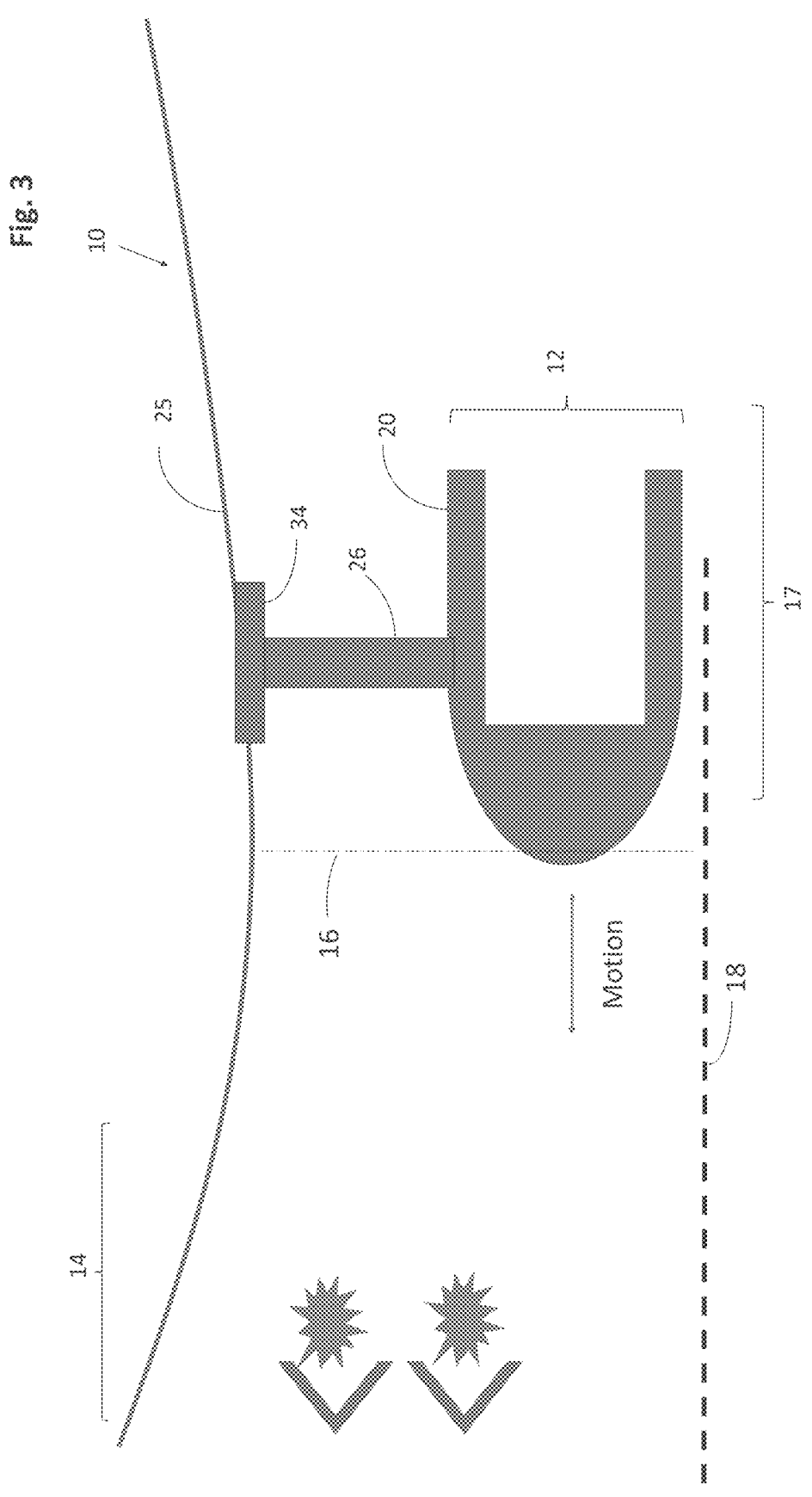
FIG. 3 is a view, similar to FIG. 1, of yet another embodiment of a RBCC propulsion system in accordance with the present disclosure.

Referring to FIG. 3, in another embodiment, the RDRE 12 is supported on the RJ exhaust section 17 by struts 26 which in turn are supported on the exhaust section wall 25 on a movable support 34. This permits us to translate the RDRE 12 axially within the throat area 16 of the RJ to modify the effective geometry of the RDRE 12 outer surface within the RJ throat area 16, and therefore to modify the RJ throat area 16, to optimize RJ performance.

Figure 4:
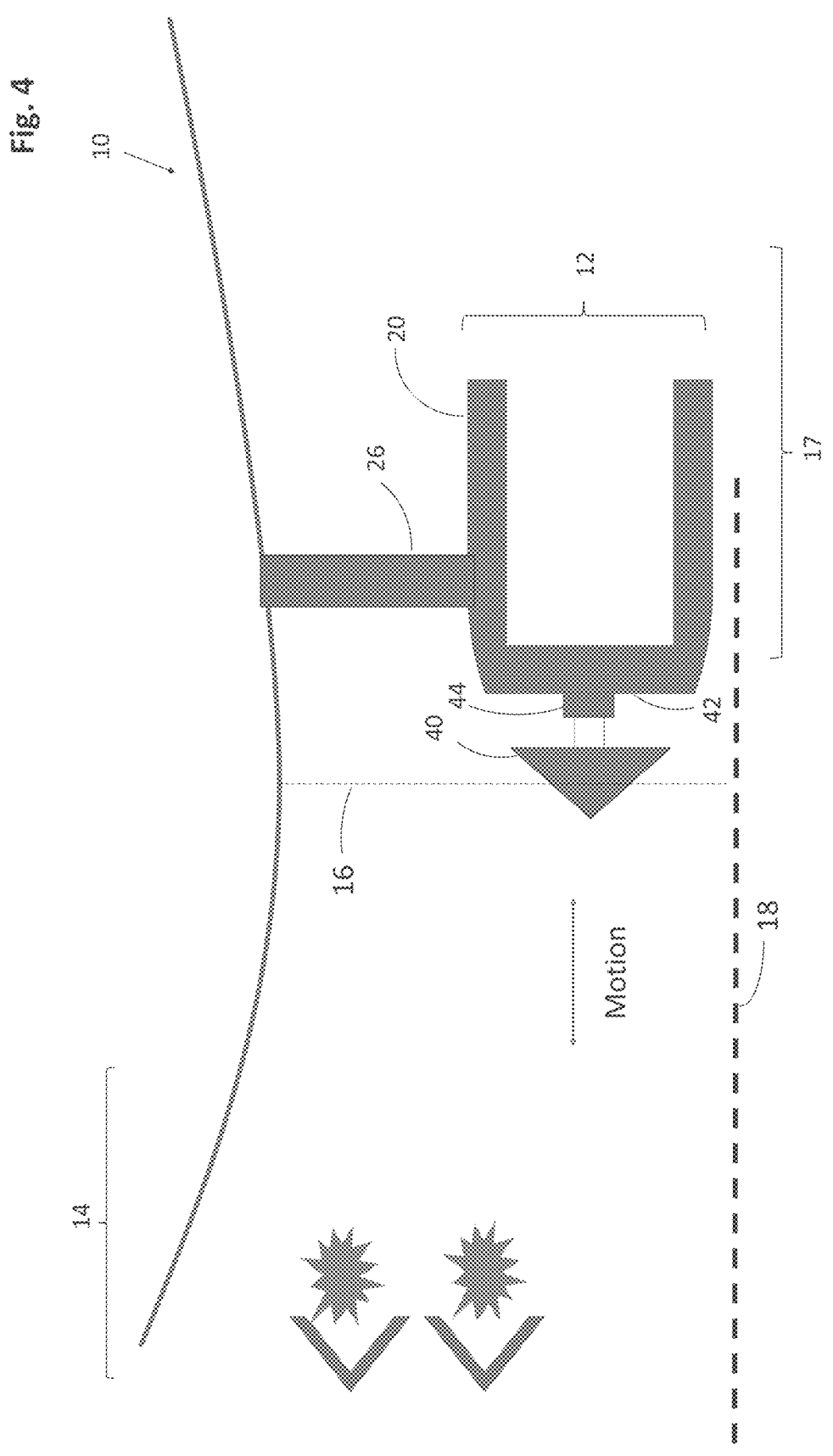
FIG. 4 is view, similar to FIG. 1, of yet another embodiment of a RBCC propulsion system in accordance with the present disclosure.

Referring to FIG. 4, in yet another embodiment, the RDRE 12 is fixedly positioned in the RJ exhaust section 17 via struts 26. A movable cover member 40 is fixed to the leading end 42 of the RDRE 12, on an adjustable actuator or piston 44. Cover member 40 is axially movable relative to the RDRE 12 to modify the geometry and effective surface area of the RDRE 12 within the RJ throat area 16, and therefore to modify the RJ throat area 16, to optimize RJ performance.

Figure 5:
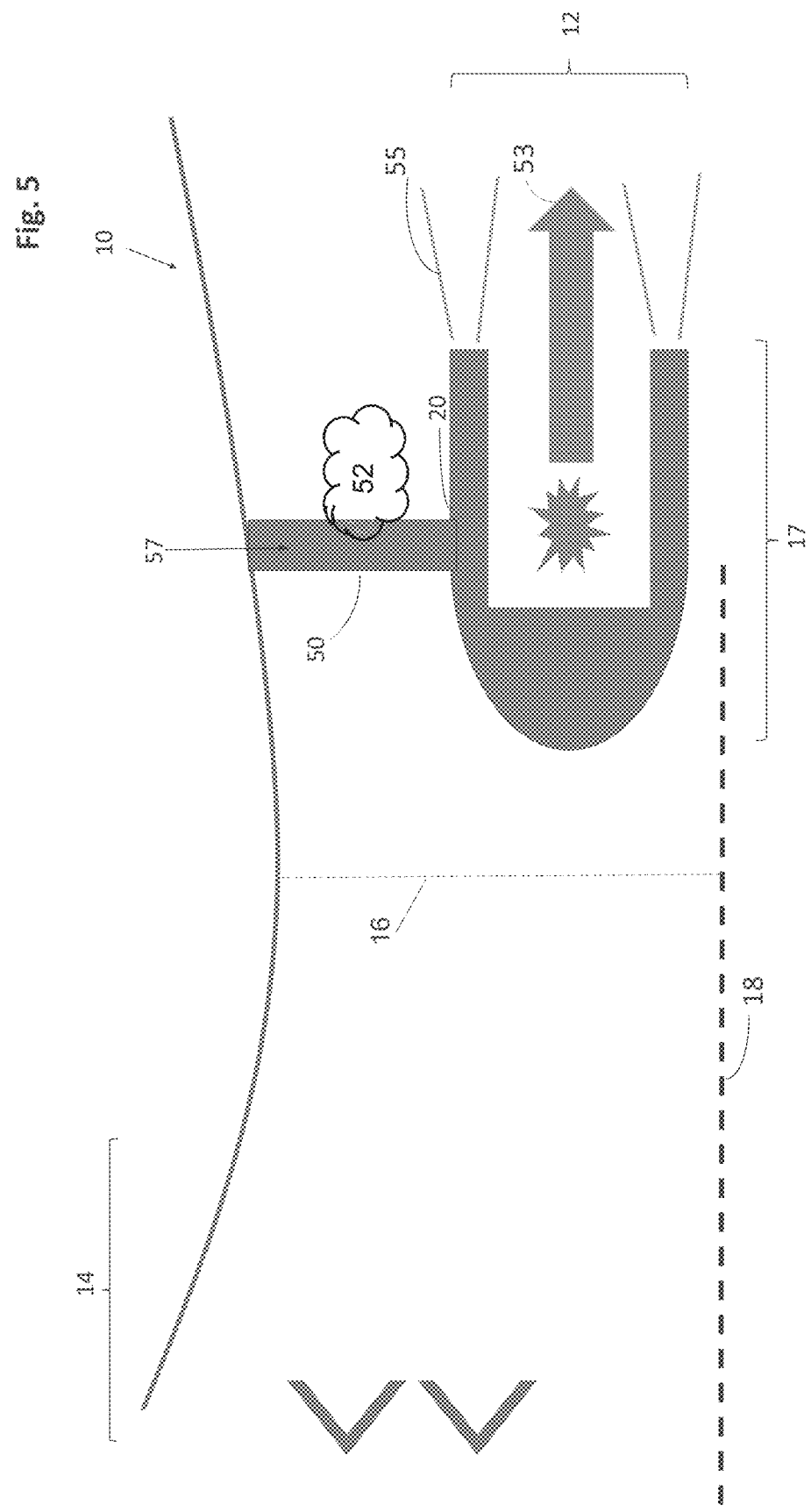
FIG. 5 is view, similar to FIG. 1, of yet another embodiment of a RBCC propulsion system in accordance with the present disclosure.

Referring to FIG. 5, in yet another embodiment, the RDRE 12 is supported in the RJ throat area 16 via a hollow strut 50. Hollow strut 50 includes pores configured to inject fuel 57 into the exhaust section 17 of the RJ 14 downstream of the RJ combustion to support secondary combustion downstream of the RJ primary combustion. Fuel 57 is piped through the strut 50 and is injected into the flow resulting in a fuel-air mixture 52 which flows through the exhaust portion of the RJ 14. The hot exhaust gases 53 of the RDRE 12 acts as a flameholder and the fuel-air mixture 52 is further mixed in a recirculation zone at the trailing edge of the RDRE and is combusted in a secondary combustion zone 55.

Figure 6:
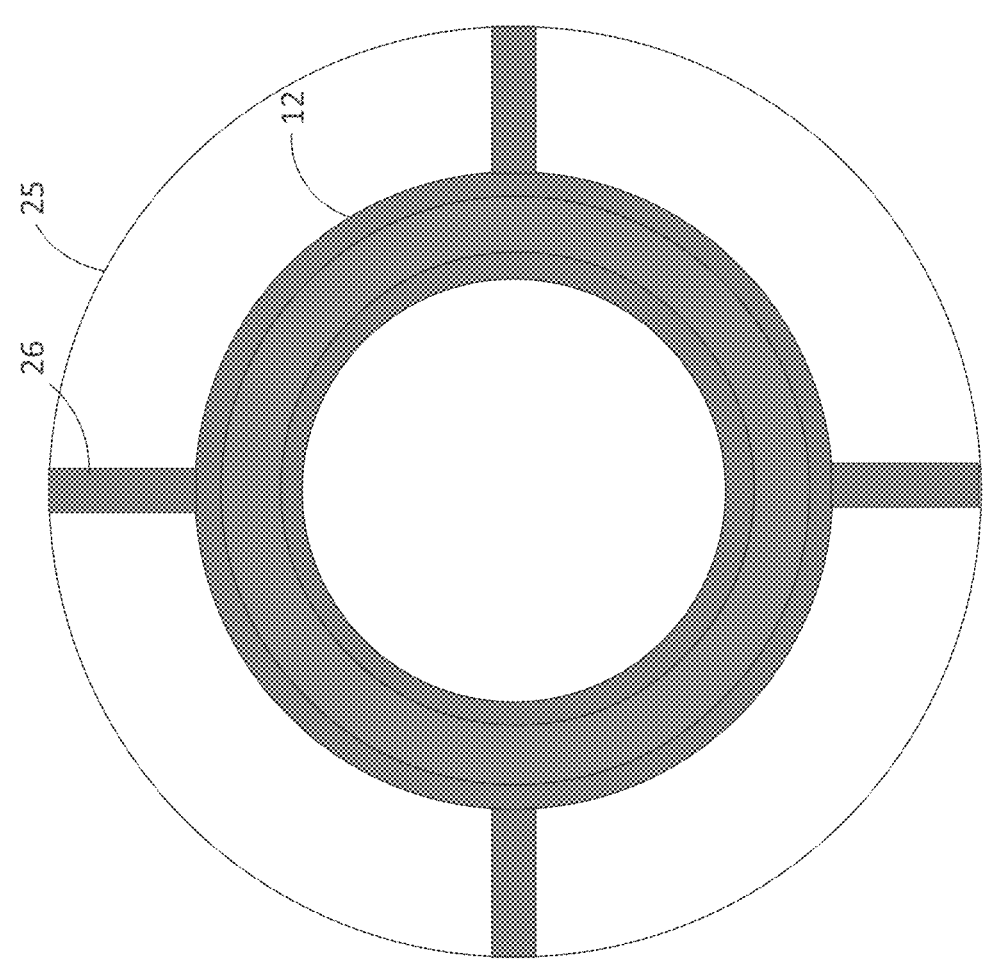
FIG. 6 is an end view of the RBCC embodiments, shown in FIGS. 2-5, showing the RBCC propulsion system in accordance with the present disclosure.

Referring to FIG. 6, a view axially through the end of the RDRE is shown, consistent with the embodiments described in FIGS. 2-5. The RDRE 12 is shown placed symmetrically around the centerline of the walls 25 of the RJ throat area supported by hollow struts 26.

Figure 7:
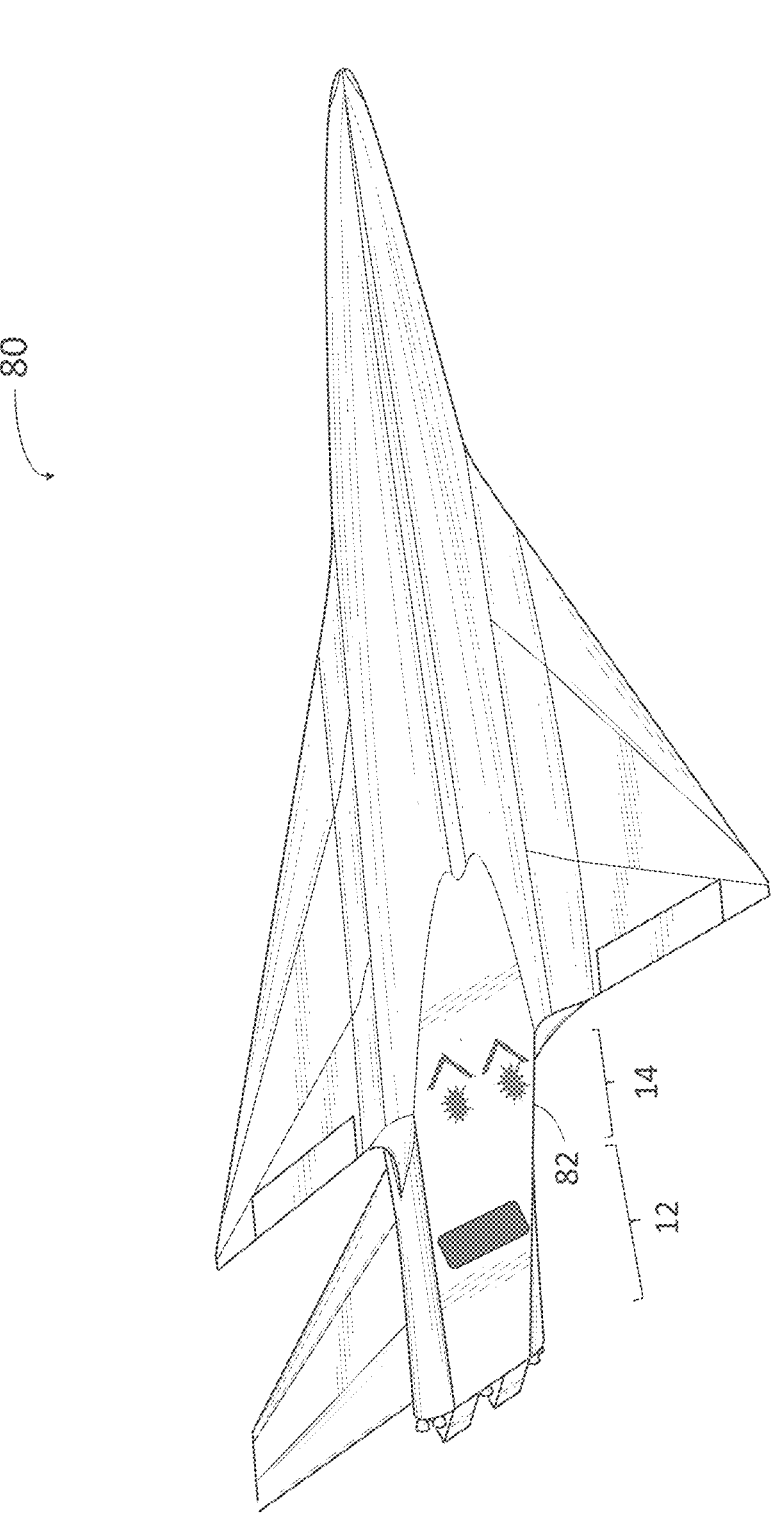
FIG. 7 is a schematic view of a RBCC powered hypersonic aircraft in accordance with the present disclosure.

Referring to FIG. 7, there is shown an aircraft 80 having a rocket-based combined cycle (RBCC) propulsion system 82 comprising a RJ 14 and a rotating detonation rocket engine (RDRE) 12 in accordance with the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed:

1. An aircraft having a rocket-based combined cycle (RBCC) propulsion system comprising a rotating detonation rocket engine (RDRE) and an airbreathing jet engine, wherein the RDRE is located within a throat area of the jet engine and is configured to be cooled by ram air bypassed from upstream of the jet engine, wherein the RDRE is supported in the throat area of the jet engine via studs, wherein the RDRE includes a cover or shield on its leading end, and wherein the cover or shield is axially movable relative to the leading end of the RDRE.

2. The aircraft of claim 1, wherein the studs are hollow at least in part.

3. The aircraft of claim 2, wherein the studs include pores configured for expelling cooling air onto a surface of the RDRE.

4. The aircraft of claim 2, wherein the studs include pores configured for expelling unburned fuel downstream of the studs.

5. The aircraft of claim 1, wherein the RDRE is movably supported in the throat area of the jet engine.

6. The aircraft of claim 1, wherein the bypassed ram air is directed to film cool an outer surface of the RDRE.

7. The aircraft of claim 6, wherein the bypassed ram air is cooled by passing through a heat exchanger before film cooling the RDRE.

8. The aircraft of claim 7, wherein the bypassed ram air is cooled by heat exchange with fuel for the jet engine before film cooling the RDRE.

9. The aircraft of claim 1, wherein the RDRE is fixedly positioned relative to the jet engine throat area.

10. The aircraft of claim 1, wherein the RDRE is axially movable within the throat area of the jet engine.

11. The aircraft of claim 1, wherein the jet engine comprises a ramjet.

12. The aircraft of claim 1, wherein the jet engine comprises a scramjet.

13. The aircraft of claim 1, wherein the jet engine comprises a turbojet.

\* \* \* \* \*